J. A. CUNNINGHAM.
Steam Boiler.
No. 229,966.          Patented July 13, 1880.
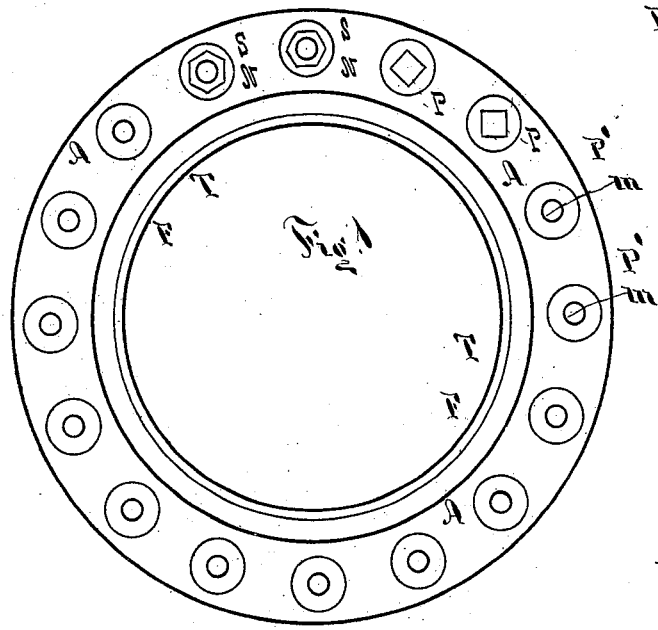
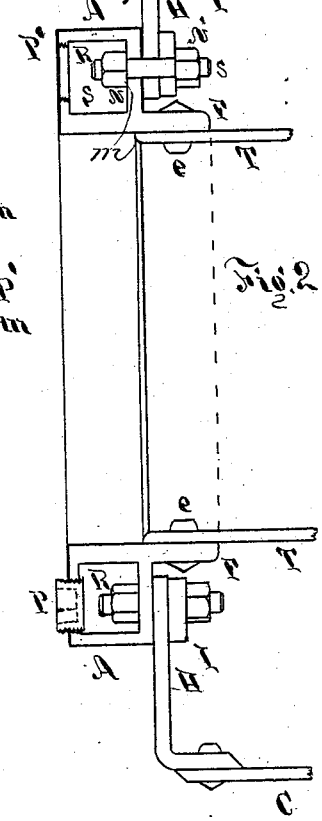
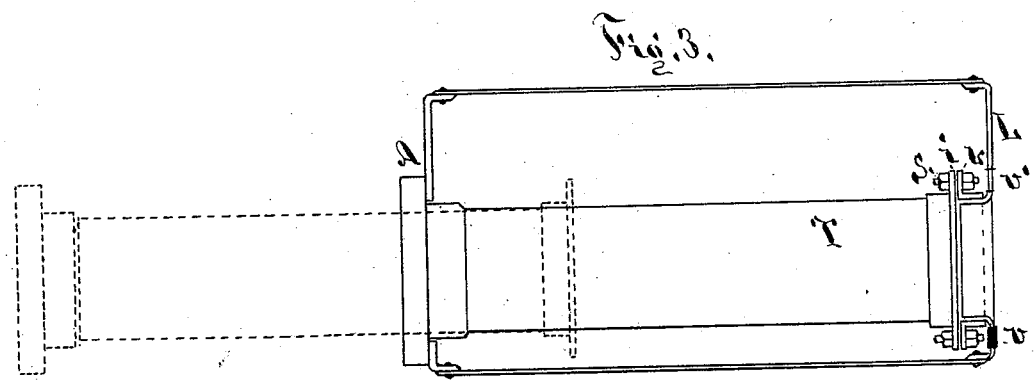
Witnesses:
Barton P. Ward
A. D. Kilborn
Inventor.
John A. Cunningham.
per Atty.—
A. S. Waterhouse

UNITED STATES PATENT OFFICE.

JOHN A. CUNNINGHAM, OF SACRAMENTO, CALIFORNIA.

STEAM-BOILER.

SPECIFICATION forming part of Letters Patent No. 229,966, dated July 13, 1880.

Application filed October 30, 1879.

*To all whom it may concern:*

Be it known that I, JOHN A. CUNNINGHAM, of the city of Sacramento, State of California, have invented a new and useful Improvement in Steam-Boilers, of which the following is a specification.

The invention relates to that class of boilers in which flues are employed.

The invention consists in the manner of inclosing the bolts used in joining the boiler and flue together within the boiler by providing the flue with a hollow annular flanged ring at one end and with an angle-flange at the other, so arranged that the bolts and nuts used in making the joints shall be entirely protected from the fire and inclosed with the steam and water.

In the accompanying drawings similar letters of reference indicate like parts.

Figure 1 is an elevation of one end of a boiler-flue with a hollow annular flanged ring attached, embodied in my invention. Fig. 2 is a side sectional elevation of Fig. 1. Fig. 3 is a sectional side elevation of a boiler with flue connected, showing the method by which the flue is connected to the boiler, with the same disconnected shown in dotted lines.

Fig. 1 shows an end view of a flue around which is riveted the annular hollow ring A. The ring is riveted to the flue T, as shown in Fig. 2, by means of the flange F, through which the rivets e pass that extend through the flue T.

The ring A is provided with a square annular recess, R, passing around it, as shown in Fig. 2. Extending through the shell of said ring A are the holes P', that lead into the annular recess R, and through the opposite side of the ring A extend the smaller holes m, and by reference to Fig. 2 it will be seen that the holes m are used for the bolt S to pass through, and the larger hole on the opposite or front side of A, being in line with hole m, is used to pass the bolt S through in entering it into m, and to admit a socket-wrench to pass through for the purpose of tightening the nut N on the bolt S. After the nut is tightened the hole P' is closed up by means of the screw-plug P. (Shown in the lower part of Fig. 2.)

Fig. 1 shows the ring A, with wrench-holes P' and small holes m in line with holes P'; also plugs P, provided with square turning sockets screwed into holes P'; also the screw S and nut N.

Having described the ring A, I will now show its uses.

In Fig. 2 the bolts S extend out from the ring A and pass through the boiler-head H, and the bolt being provided with a nut or head, N', enables the nut N, by being screwed up, to tighten the joint between the ring A and the boiler-head H, so as to hold them firmly together. In this case I use an iron ring, I, through which the bolts pass to strengthen the head H. Any kind or form of gasket can be used between the joints of A and H.

In Fig. 3 is shown the ring A, attached to the flue T and screwed to the boiler-head H. The flue T extends through the boiler to i, at which end it is provided with an annular angle-flange, i, which is bolted to a similar flange, k, connected to the head L, as shown. The bolts S are inserted through round openings or holes v', which are made through the head L, in line with the bolts S, so that the holes v' can be used for the purpose of passing the bolts in in entering them in the flanges i and k, and also in passing a socket-wrench through in tightening up the nuts. After the flanges i and k are securely screwed together by the bolts S, the holes v' are then closed up by means of screw-plugs v, thus making the boiler steam-tight and inclosing the bolts within the boiler and away from the action of fire. In the case of the bolts arranged within the ring A, I provide a suitable number of holes leading from within the boiler and through the head H and into the recess R, through which the water and steam can pass, thus completely surrounding the bolts S and nuts N and protecting them from the action of the fire.

The ring A can be used in any form of boiler, whether it extends outside of the boiler-head, as shown, or is inclosed entirely within the fire-box, as in some cases it may be located.

Fig. 3 shows, in dotted lines, the manner in which the flue can be partly removed from the boiler in order to get at the inner side of each for cleaning them, In construction the ring A and flue T can be formed of polygonal shape, such as hexagon or other form, as well as round.

What I claim as my invention is—

1. The hollow ring A, provided with flange F, for securing the same to the flue T, also the wrench-holes P′ and bolt-holes m, for receiving the bolts and nuts used in securing the ring A to the boiler-head H, and the plugs P, for closing up the wrench-holes P′, substantially as and for the purposes set forth.

2. The combination of the angle-flange i, secured to the flue T, and the flange k, secured to the boiler-head L, with the wrench-holes v′, made in the boiler-head L, for inserting and tightening the bolts S, and the plugs v, for closing the wrench-holes v′, substantially as and for the purposes set forth.

JOHN A. CUNNINGHAM.

Witnesses:
BARTON B. WARD,
A. D. HILBORN.